United States Patent [19]

Hotta et al.

[11] Patent Number: 4,927,455

[45] Date of Patent: May 22, 1990

[54] PLANT GROWTH MEDIUM

[75] Inventors: Saburo Hotta; Yoshiaki Kikuchi, both of Yokohama; Masanori Takaya, Tokyo; Takashi Inoue, Yokohama, all of Japan

[73] Assignee: Kyodo Shiryo Co., Ltd., Kanagawa, Japan

[21] Appl. No.: 91,864

[22] Filed: Sep. 1, 1987

[30] Foreign Application Priority Data

| Sep. 12, 1986 [JP] | Japan | 61-215087 |
| Jan. 14, 1987 [JP] | Japan | 62-5035 |
| Jun. 9, 1987 [JP] | Japan | 62-142233 |

[51] Int. Cl.$^5$ .................... C05G 3/04; C09K 17/00
[52] U.S. Cl. .................... 71/64.13; 71/64.09; 71/903; 71/904; 47/1.01; 47/74
[58] Field of Search .................... 71/64.09, 64.13, 903, 71/904; 47/1.01, 74

[56] References Cited

U.S. PATENT DOCUMENTS

| 2,891,355 | 6/1959 | Nelson | 71/904 |
| 3,812,619 | 5/1974 | Wood et al. | 71/904 |
| 3,900,378 | 8/1975 | Yen et al. | 204/159.14 |
| 3,973,355 | 8/1976 | McKenzie | 47/37 |

FOREIGN PATENT DOCUMENTS

| 0545333 | 11/1985 | Australia . |
| 0006299 | 5/1979 | European Pat. Off. . |
| 0141373 | 10/1984 | European Pat. Off. . |
| 0144300 | 11/1984 | European Pat. Off. . |
| 2134507 | 1/1984 | United Kingdom . |

*Primary Examiner*—Charles T. Jordan
*Assistant Examiner*—Richard W. Wendtland

[57] ABSTRACT

Disclosed herein is a plant growth medium obtained by forming a mixture of a conventional powdery plant culture medium and a gel-formable material into a sheet and then solidifying the sheet or by forming a mixture of such a conventional culture medium, a gel-formable material and a water-holding material into a sheet, granules, pellets, tablets or powder and then solidifying the thus-formed mixture. By simply adding water to the plant growth medium and reconstituting same, the plant growth medium can be used for the germination, growth, transplantation, cutting and the like of a plant.

6 Claims, No Drawings

PLANT GROWTH MEDIUM

BACKGROUND OF THE INVENTION

(1) Field of the Invention

This invention relates to a medium for raising a plant, and more specifically to a plant growth medium which permits long-term storage at the environmental temperature and can be used for the gemination and subsequent growth of seeds by simply adding water thereto upon its use.

(2) Description of the Prior Art

As culture media for raising plants, powdery culture media with various medium ingredients incorporated therein in powdery forms have heretofore been proposed and sold on the market. Although these conventional powdery culture media can be stored over a long period of time, it is indispensable, upon their use, to add suitable amounts of water and a gel-formable material such as agar to them and then to subject the resulting mixtures to heat sterilization. They are hence accompanied by a practical drawback that their handling is inconvenient for users such as farmers.

SUMMARY OF THE INVENTION

A principal object of this invention is therefore to provide a plant growth medium which permits long-term storage at the environmental temperature and can be used directly for the germination and/or growth of a plant by simply adding water thereto upon its use.

In one aspect of this invention, there is thus provided a plant growth medium obtained by adding and mixing a gel-formable material with a conventional powdery plant culture medium, forming the resultant mixture into a sheet and then drying and solidifying the sheet.

In another aspect of this invention, there is also provided a plant growth medium obtained by adding a gel-formable material and water-holding material with the MS medium, forming the resultant mixture into a desired shape such as sheet, pellets, tablets, granules or powder, and then drying and solidifying the thus-formed mixture.

The above plant growth media of this invention can each be used effectively with an extremely simple operation for the germination and subsequent growth of seeds by simply adding water thereto. Depending on the form of the medium, it may also be used as an acclimatizing medium for the transplantation of a tissue-cultured plant to soil or as a cutting medium.

In addition, the above plant growth media of this invention are convenient to handle for users since they do not undergo changes in quality even when stored for a long period of time at the environmental temperature.

The above and other objects, features and advantages of this invention will become apparent from the following description and the appended claims.

DETAILED DESCRIPTION OF THE INVENTION

More specifically, the above-described plant growth media of this invention may be obtained in the following manner. In order to obtain the former plant growth medium of this invention, a gel-formable material is added first of all to a conventional powdery plant culture medium (e.g., Murashige & Skoog medium, hereinafter abbreviated as "MS medium"). The resulting mixture is then heated into a liquid form, followed by its formation into a sheet by a method known per se in the art. The sheet is thereafter dried and solidified. On the other hand, the latter plant growth medium of this invention may be obtained in the following manner. An aqueous mixture of a gel-formable material, water-holding material and water is added to a conventional powdery plant culture medium. The resultant mixed medium is formed into a sheet, pellets, tablets, granules or powder, and is then dried and solidified.

The term "conventional powdery plant culture medium" as used herein means a powdery culture medium obtained by mixing various powdery plant nutrients. Illustrative examples of the conventional powdery plant culture may include commercial media such as the MS medium (1962), White medium (1963), $B_5$ medium (1975), and Hyponex medium (which uses the Kano medium as a base) and Nitsh medium (1967), as well as commercial mixed fertilizers formed by mixing various powdery fertilizers.

The term "gel-formable material" as used herein means a material which exhibits stickiness in the presence of water, is converted into a gel at the environmental temperature and is solidified when dried. This term embraces, for example, agar, carageenan, gelatin, pullulan (bacteria origin), montmorillonite and polyvinyl alcohol.

According to the former aspect of this invention, a mixture obtained by adding a gel-formable material such as that exemplified above to a conventional powdery plant culture medium is heated into a liquid form. The resulting liquid mixture is then formed into a sheet, the thickness of which may range from 10 mm to 15 mm by way of example. It is preferable to conduct the heating, for example, at 120° C. for about 15 minutes so as to effect sterilization at the same time. The drying of the resultant sheet may be effected by vacuum freeze drying, vacuum drying, high-frequency drying, infrared drying or freeze/hot-air drying. Among these drying methods, vacuum freeze drying is particularly preferred because it allows the growth medium to hold air therein and hence to promote the rooting of a plant upon application of the growth medium.

Upon production of the above-described sheet-like plant growth medium, a fertilizer, a plant hormone, activated carbon and/or the like may be added to the sheet before drying and solidification of the sheet. It is also possible to impart buoyancy to the above-obtained sheet-like growth medium so as to make the plant growth medium suitable for use in underwater cultivation by hydroponics or water culture. This buoyancy can be imparted, for example, by embedding a buoyant material in the sheet before its drying and solidification or by fixing a buoyant material to the back side of the sheet before its drying and solidification.

According to the latter aspect of this invention, the above-mentioned gel-formable material and water-holding material are mixed together in the presence of water. The resulting mixture is added and mixed with a conventional powdery plant culture medium (for example, the MS medium). The thus-obtained mixture is formed into a desired one of various shapes and is then dried and solidified. By the term "water-holding material" as used herein is meant a material which has good water-holding capacity and goes not give any adverse effects to the growth of plants. This term embraces cellulose materials such as fibrous pulp, water-holding fibrous materials such as sphagnum, rock wool (asbestos), etc.

No particular limitation is necessarily imposed on the mixing ratio of the water-holding material to the gel-formable material. They may be mixed at any ratio, so long as the mixture which is obtained by mixing them in the presence of water can be formed into a sheet, pellets, tablets, granules or powder. For example, 5 g of fibrous pulp may be mixed with 0.25 g of agar in the presence of 100 ml of water.

The thus-obtained mixture is mixed with a conventional powdery plant culture medium and then formed into a sheet, pellets, tablets, granules or powder by a forming method known per se in the art. An extruder, especially, twin-screw extruder may be used for the above formation. Upon effecting the above formation, a fertilizer and/or one or more other nutrients may be added to the mixture.

The thus-obtained sheet is then dried and solidified. This drying can be effected by a method known per se in the art. It is however preferable to conduct the drying by vacuum freeze drying because it allows the resulting growth medium to hold air therein and hence to promote the rooting of a plant.

In order to use the above-produced plant growth medium according to each of the aspects of this invention for the growth of a plant, it is preferable to fix desired plant seeds in advance on the front side of the growth medium with an adhesive, for example, a natural glue such as starch bond or gum arabic or a synthetic adhesive. When a suitable amount of water is added to the seed-bearing growth medium to reconstitute same upon its application, the seeds are allowed to germinate as the times goes on. The growth medium, which has been produced by mixing, forming and solidifying the gel-formable material and water-holding material, may be used upon transplantation of a tissue-cultured plant to soil, namely, as an acclimatizing medium. In this application, a plant obtained by tissue culturing is washed thoroughly with water so as to remove the components of a culture medium employed for the tissue culturing. The plant is then transplanted to the growth medium. By adding water to maintain the growth medium in a highly wet state, the rooting of the plant is promoted. When rooting is observed, the plant may be transplanted directly to soil such as a field.

This growth medium can also be used for cuttage. A cutting is planted in the growth medium. When rooting is observed, the rooted cutting may be transplanted directly to soil.

On the other hand, the sheet-like plant growth medium produced by adding the gel-formable material to a conventional powdery plant culture medium can be used for the growth of a plant in accordance with hydroponics or water culture by imparting buoyancy to the growth medium as mentioned above.

The present invention will hereinafter be described more specifically by the following Examples. It should however be borne in mind that the scope of the present invention is not limited to the following Examples.

EXAMPLE 1

An agar-added MS (Murashige & Skoog) culture medium of the following composition was prepared. The culture medium was thereafter placed in an autoclave, in which it was heated and sterilized at 120° C. for 15 minutes.

| Composition | (unit: mg/l) |
| --- | --- |
| $KH_4NO_3$ | 1650 |
| $KNO_3$ | 1900 |
| $CaCl_2.2H_2O$ | 440 |
| $MgSO_4.7H_2O$ | 370 |
| $KH_2PO_4$ | 170 |
| $FeSO_4.7H_2O$ | 27.8 |
| $Na_2$—EDTA | 37.3 |
| $MnSO_4.4H_2O$ | 22.3 |
| $ZnSO_4.7H_2O$ | 8.6 |
| $CoCl_2.6H_2O$ | 0.025 |
| $CuSO_4.5H_2O$ | 0.025 |
| $Na_2MoO_4.2H_2O$ | 0.25 |
| KI | 0.83 |
| $H_3BO_3$ | 6.2 |
| Sucrose | 30,000 |
| Agar | 10 |

The culture medium, which has been converted into a liquid form by the above heating, was poured in an aluminum tray (25 cm × 30 cm × 3 cm) to a thickness of about 1 cm and was then allowed to cool down to gelatinize same.

The thus-obtained sheet-like gel was frozen to −40° C. and was thereafter subjected to vacuum freeze drying in a vacuum of −0.04 torr.

The resulting solidified sheet-like growth medium was cut into 5 cm × 5 cm squares. On one side of the thus-cut squares of the growth medium, the following seeds were separately adhered with gum arabic: Japanese morning glory, garden balsam, rice, kaiware daikon ("2MAMINA", trade mark), sweet basil, landcress, lettuce, chervil, sunflower, honewort, tomato and strawberry.

The above-prepared individual squares of the growth medium with their corresponding seeds fixedly adhered thereon were added with sufficient water to investigate the state of their germination.

As a result, Japanese morning glory and kaiwar-daikon germinated on the following day. It took 10–14 days until honewort germinated. The other seeds took additional 4–5 days until their germination.

EXAMPLE 2

One wt. % agar solution was poured in an aluminum tray (25 cm × 30 cm × 3 cm) to a depth of 2 cm and then allowed to cool down. Shortly before its gelatinization, suitable amounts of commercially-available "Hyponex" medium (powder form), an encapsulated fertilizer and activated granular carbon were added. The resultant sheet-like gelatinized medium was dried and solidified by following the procedure of in Example 1. Various seeds were then fixed separately on one side of square sheets of the thus-solidified growth medium in the same manner as in Example 1. Square sheets obtained above were then separately placed with the seed-bearing sides up in pots in which vermiculite and a filler were filled. Water was sprinkled over the seeds to germinate same. Similar to Example 1, all seeds germinated and grew well.

EXAMPLE 3

Following the procedure of Example 2, 1 wt. % agar solution was poured in a tray and then allowed to cool down. When the temperature of the solution had dropped to 45° C., small beads of expanded polystyrene were sprinkled together with a commercial mixed fertilizer over the agar solution and the agar solution was then allowed to gel as was, whereby the small beads of expanded polystyrene were fixed to the resultant gel.

The above-obtained sheet-like gel was subjected to vacuum freeze drying under the same conditions as those employed in Example 1, so that the sheet-like gel was solidified. In the same manner as in Example 1, various seeds were fixed separately on one side of square sheets of the resultant plant growth medium, which sides were opposite to the sides on which the small beads of expanded polystyrene were fixed.

The square sheets with their corresponding seeds fixed thereon were allowed to float in water, in which plant nutrients had been added, with the beads-bearing sides down, so that underwater cultivation of the seeds were conducted. As a result, all seeds germinated and grew well similar to Example 1.

EXAMPLE 4

Production of Growth Medium

A mixture of 27 g of fibrous pulp and 3 g of agar was mixed with 1 l of a twofold dilute solution of the MS medium (free of sucrose). The resulting mixed growth medium was then heated to dissolve the agar. The thus-obtained liquid mixture was poured in an aluminum tray (25 cm × 30 cm × 3 cm) to a thickness of about 1 cm and was then allowed to cool down into a gel.

The resultant sheet-like gel was freeze-dried to −35° C. and was then subjected to freeze vacuum drying under a vacuum of −0.1 torr, thereby obtaining a sheet-like growth medium.

Growth of Plant on the Growth Medium

Sterilized leaf fragments of Saint Paulia were placed on the MS medium to which 1 mg of naphthaleneacetic acid and 1 mg of benzyladenine had been added. The leaf fragments were cultured at 25° C. while lighting for 16 hours. After the lapse of 2 months, foliaged young plants were transplanted to the MS growth medium free of any hormones and were then cultured for 1 month under the same conditions as employed above.

Young plants of 3 cm long obtained by the above culture were taken out of the MS medium. Their roots were washed thoroughly with water to remove the components of the medium. They were then planted on the plant growth medium which had been reconstituted with water in the same manner as mentioned above. The growth medium was covered to avoid its drying and the young plants were thereafter allowed to grow. After the lapse of 7-10 days, the cover was removed and the plants were allowed to grow under natural conditions. The state of their growth was good and was by no means inferior to the state of growth of plants on conventional media.

EXAMPLE 5

Mixed with 300 ml of perlite were 165 ml of water, which had been added with 0.1 ppm of naphthaleneacetic acid and a powdery delayed release fertilizer, and 8.25 g of polyvinyl alcohol. The resultant mixture was heated for 5 minutes at 120° C. in an autoclave. The thus-obtained mixture was filled in an aluminum mold in the form of a truncated cone (bottom diameter: 4.5 cm; top diameter: 7 cm; and height: 4 cm) to the top surface of the mold, so that the mixture was molded.

The resultant molding was released from the mold and then heated at 100° C. for 4 hours to obtain a solid growth medium.

Growth of Plant on the Growth Medium

The dry solid growth medium obtained above was added with water in such a sufficient amount as forming free water and cuttage was conducted in accordance with the following procedure.

A hole was formed in the upper surface of the dry solid growth medium. A new carnation bud obtained from a blanched part was inserted in the hole. When the bud was covered with a film of a vinyl chloride resin and was left over in a room, the growth and rooting of the new bud were observed.

The state of its subsequent growth was good and was by no means inferior to the state of growth of plants on conventional media.

We claim:

1. Plant growth medium obtained by a process comprising a gel-formable material and water-holding material with a conventional powdery plant culture medium, forming the resultant mixture, and then drying and solidifying the thus-formed mixture by vacuum freeze drying, the water-holding material being selected from the group consisting of vermiculite, perlite, zeolite, cellulose materials, water-holding fibrous materials, ceramic raw materials and rock wool, and the gel-formable material being selected from the group consisting of agar, carrageenan, gelatin, pullulan of bacterial origin and montmorillonite.

2. The plant growth medium as claimed in claim 1 wherein the solidification of the sheet is effected after imparting buoyancy to the sheet.

3. The plant growth medium as claimed in claim 1 wherein the buoyancy is imparted to the sheet by embedding a buoyant material in the sheet or by fixing a buoyant material on the back side of the sheet.

4. Process for preparing a plant growth medium comprising adding a gel-formable material and water-holding material with a conventional powdery plant culture medium, forming the resultant mixture, and then drying and solidifying the thus-formed mixture by vacuum freeze drying, the water-holding material being selected from the group consisting of vermiculite, perlite, zeolite, cellulose materials, water-holding fibrous materials, ceramic raw materials and rock wool, and the gel-formable material being selected from the group consisting of agar, carrageenan, gelatin, pullulan of bacterial origin, and montmorillonite.

5. The process as claimed in claim 4 wherein the solidification of the sheet is effected after imparting buoyancy to the sheet.

6. The process as claimed in claim 4 wherein the buoyancy is imparted to the sheet by embedding a buoyant material in the sheet or by fixing a buoyant material on the back side of the sheet.

* * * * *